INVENTOR.
WILLIAM A. ROBINSON
JAMES E HUSTON
BY
Robertson & Smythe
ATTORNEYS

INVENTOR.
WILLIAM A. ROBINSON
JAMES E HUSTON
BY
Robertson & Smythe
ATTORNEYS

United States Patent Office 3,283,127
Patented Nov. 1, 1966

3,283,127
CONTROL CIRCUIT

William A. Robinson, McHenry, and James E. Huston, Des Plaines, Ill., assignors to Basic Products Corporation, Elk Grove, Ill., a corporation of Wisconsin Filed Dec. 12, 1963, Ser. No. 330,178
8 Claims. (Cl. 219—486)

This invention relates to timing circuits, particularly one adapted for use in the control of automatic packaging machinery.

In the prior art, either vacuum tubes or more often electromechanical relays have been used to control power fed to the heaters in automatic packaging machines wherein heat is used to make and seal packages filled with material. The use of electromechanical relays, which was the more common practice, involved certain problems, particularly contact bounce in the relays, such being particularly noticeable when the setup of the machine called for very short periods or bursts of high power to the heater used for sealing the plastic bags. If the heater required energization, for example for one or two cycles of the 60-cycle power supply, the contact bounce in the relay might be 50% of the time period. From observing some actual commercially available timers using electromechanical relays, it was found that contact bounce was a very serious problem. Such resulted in erratic seals because the time of heating successive packages would not be uniform.

One of the objects of the invention is to provide bag sealing power supply control means wherein the control means will operate faster and more positively than mechanical or vacuum tube control means.

Another of the objects of the invention is to provide a control means that will precisely control the amount of power supplied to a load or the length of time it is applied to the load.

In one aspect of the invention, an A.C. power supply source is connectable to a heating means through solid state switch means such as a pair of silicon controlled rectifiers. A first timing circuit is activated when a switch is closed by the mechanical operation of the machine, D.C. being supplied by a rectifier circuit. The first timing circuit has a unijunction transistor which discharges a circuit with a preselected or preset time constant. When the circuit discharges, a firing pulse is put on the silicon controlled rectifiers which causes conduction thereof for a predetermined part of a half wave of the A.C. supply. The power to the load and thus the heat will depend thereon.

A second switch also is actuated by the machine to activate a second timing circuit which preferably has a unijunction transistor therein similar to the first timing circuit. It is connected to the silicon controlled rectifiers and the time constant normally chosen so that the silicon controlled rectifier means will remain conducting for a longer period of time and thus provide a higher level of power or heat to the heating means or load.

A timing circuit also is activated to stop the supply of power to the load after a predetermined time, unijunction transistor means preferably being used. When the de-activating circuit becomes effective, it gates the silicon controlled rectifiers which, in effect, short circuits both of the timing circuits.

The various circuits can be arranged with means for varying the time constants. The switches actuated by the machine, which can be controlled by timers or the like, are arranged in the circuit so that both must be open before the timing circuit can start a new cycle.

These and other objects, advantages and features of the invention will become apparent from the following description and drawings which are merely exemplary.

The invention will be described in conjunction with a packaging machine but the principles can be used for other purposes where power supply is to be controlled.

Figure 1:
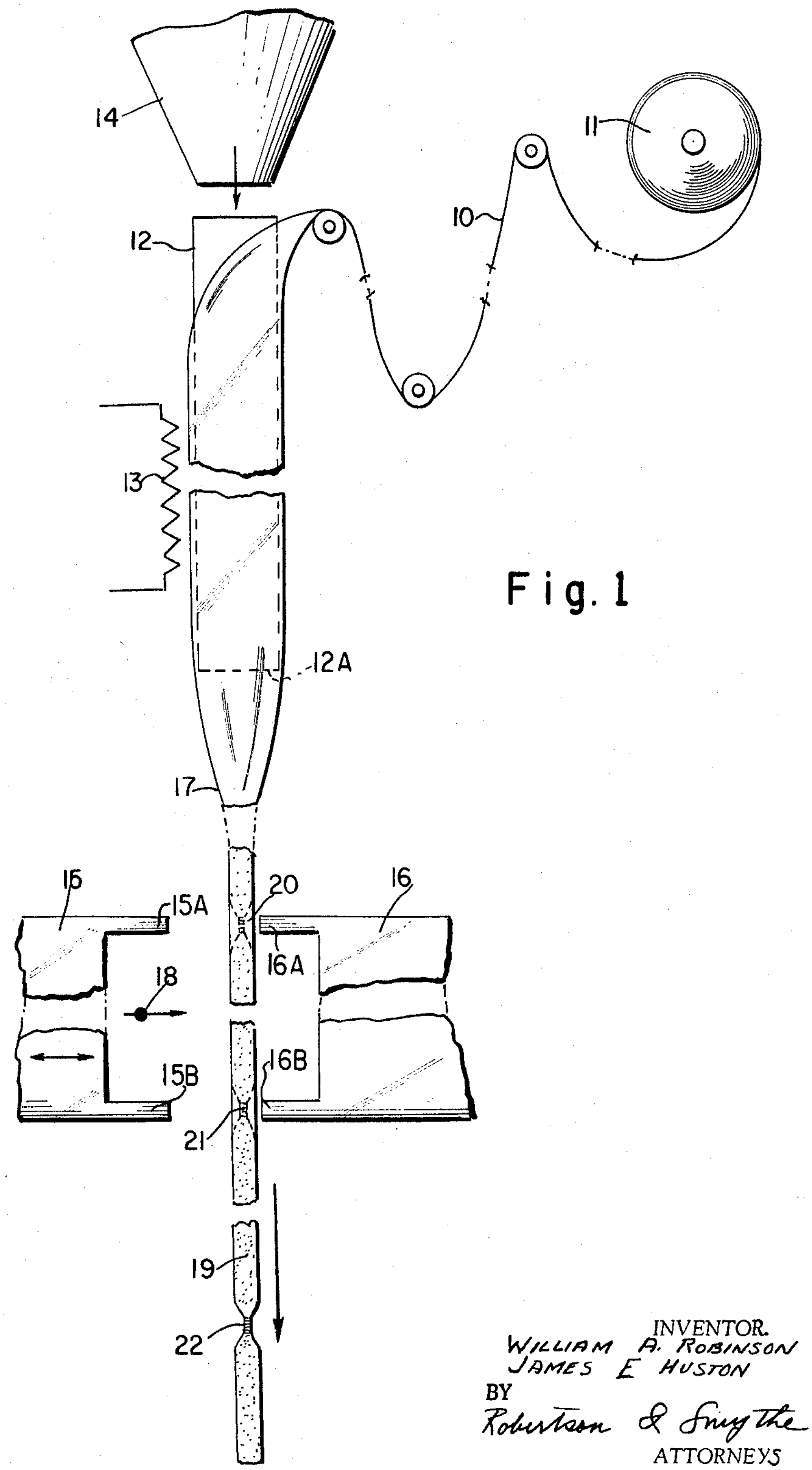
FIG. 1 shows schematically a packaging machine arrangement with which the invention can be used.

Referring to FIG. 1, a plastic film 10 carried on roller 11 is fed to a forming and filling guide 12 where it is wrapped around the guide by suitable means (not shown) and the seam sealed by a conventional heater means 13, all of which is well known in the art. As the bag passes downwardly on the guide, material is fed periodically in measured quantities through the guide 12 from hopper arrangement 14, such flowing into the guide and formed tube at exit 12A. Jaw assemblies 15 and 16 are heat sealing jaws shown in schematic form, the distance between portions 15A, 15B, and 16A, 16B, respectively, being exaggerated for purposes of illustration. One of said jaw assemblies may reciprocate relative to the other and both of said jaw assemblies reciprocate together in the direction of vertical movement of the sealed plastic tube 17. The jaw assemblies have two heating zones or areas 15A, 15B and 16A, 16B, respectively, with a hot cutoff wire 18 between said zones. As the tube or bag moves downwardly with material therein, as illustrated at 19, the jaws come together between 20 and 21, material fed thereto in measured quantities by conventional means being trapped between seal zone 21 and the prior sealed lower end 22 of the bag. Hot wire 18, or other suitable conventional cutoff mechanism, is moved to the right so as to sever the bag or tube at an appropriate time.

Figure 2:
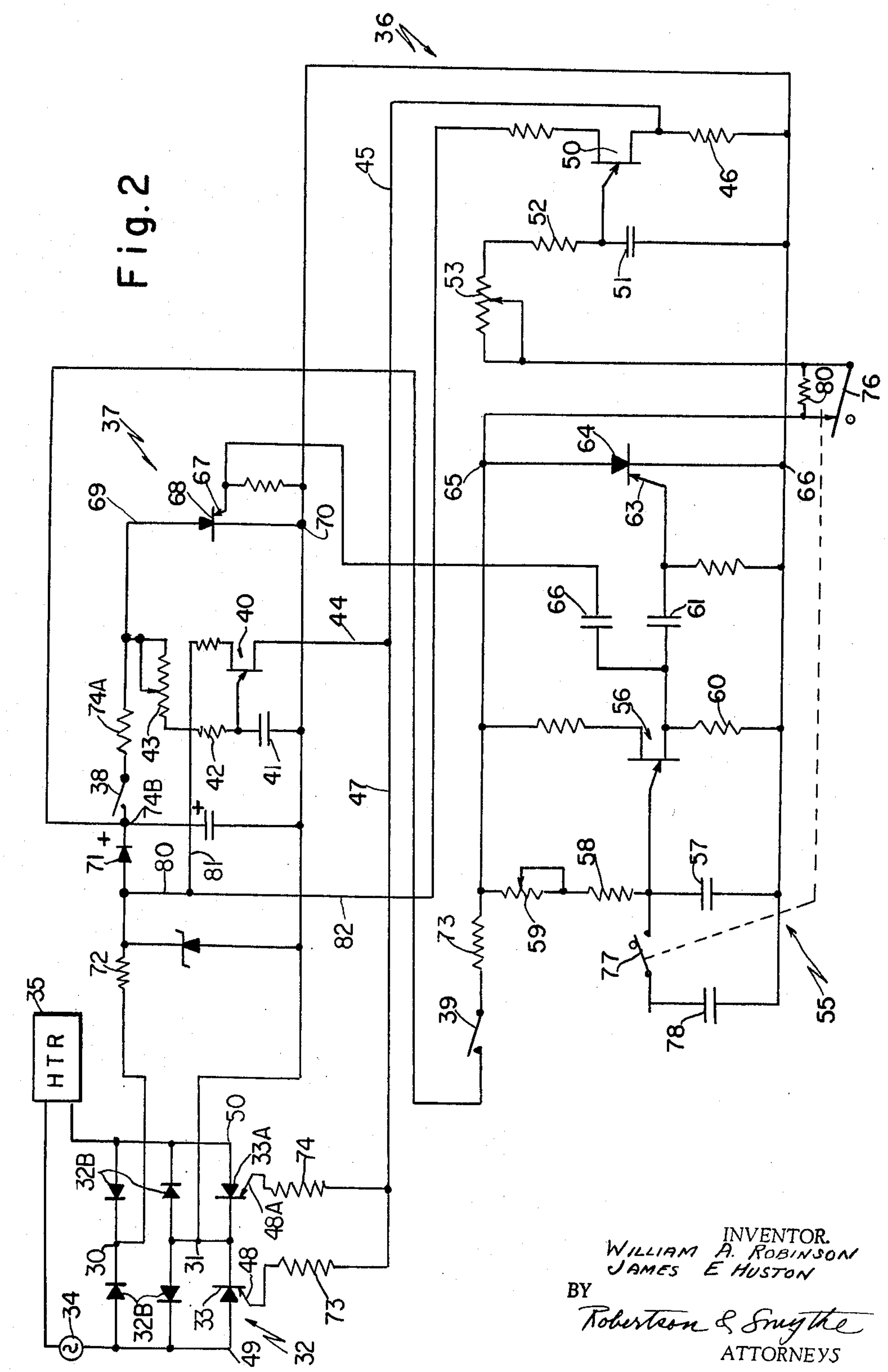
FIG. 2 is a circuit diagram of one form of the invention.

Referring to FIG. 2, D.C. is furnished to the timer circuit from terminals 30, 31, switch arrangement 32 being used which, as shown, supplies D.C. for the control circuit. In the form shown, the switch includes a pair of silicon controlled rectifiers 33, 33A. Power is supplied to the heater elements of the reciprocable jaws from power supply 34, the heater elements being shown schematically at 35. Switch arrangement 32 serves as a D.C. supply and as an A.C. switch for the heaters, diodes 32B being employed to provide D.C. to the timer circuit.

It has been found desirable in the arrangement shown to have a preheat cycle for the heaters prior to the actual sealing and this is accomplished in the circuit shown in FIG. 2. As the reciprocating jaws 15, 16 approach the plastic tube, the preheat switch 38 is closed by movement of the machine. High heat switch 39 is closed thereafter so as to initiate the high heat portion of the cycle as will be described later.

The magnitude of the low preheat and the high sealing heat is controlled by varying the firing angle of the silicon controlled rectifiers 33, 33A. This is accomplished by controlling the percentage of each half-cycle of A.C. power in which the silicon controlled rectifiers conduct. As the silicon controlled rectifiers conduct over a larger portion of the half cycle, such will result in more power being fed to the heaters. For the preheat cycle, the controlled rectifiers are made respectively to fire at some point relatively late in the half cycle, and for the so-called "high heat" for sealing the bags, the controlled rectifiers are made to fire at a relatively early point in each half cycle. The point in the half cycle where the controlled rectifiers will turn on or fire is controlled by the circuitry shown in the portion indicated generally by numeral 36 of FIG. 2.

The control of the preheat cycle will now be described. As mentioned, switches 38 and 39 are operated by mechanical operations of the machine. Switch 38 normally is closed just before the jaws have come together to pinch off the plastic tube. Upon closing of switch 38, power will be supplied to unijunction transistor 40 and its associated circuitry in portion 37 of the circuit. The D.C. voltage available from static switch 32 causes capacitor 41 to charge through resistor 42 and resistor 43, resistor 43 being variable to vary the time required to charge capacitor 41. When capacitor 41 reaches a critical voltage, unijunction transistor 40 will fire, causing capacitor 41 to discharge rapidly through lines 44, 45 and resistor 46 to generate a pulse of voltage across resistor 46. Resistor 46 is connected by means of lines 45 and 47 to gate terminals 48, 48A of controlled rectifiers 33, 33A, causing one of the controlled rectifiers 33, 33A to conduct in accordance with the power thereacross. The triggering pulses are applied through gate isolating resistors 73, 74. When one of the controlled rectifiers 33, 33A conducts, an effective short circuit is appropriately produced between terminals 49 and 50 of static switch 32, causing full voltage from source 34 to be applied to heater 35. This voltage will remain applied to the heater for the remainder of that half cycle of A.C. power because one of the controlled rectifiers 33, 33A will remain on for the remainder of the respective half cycle after receiving a triggering pulse from resistor 46. This sequence of operations is repeated every half cycle thereafter.

The magnitude of the effective power applied to heater 35 is controlled by adjusting resistor 43. As previously mentioned, resistor 43 varies the time required for capacitor 41 to charge to the firing voltage of transistor 40.

Switch 39 also is operated by the machine at the appropriate time to provide the high heat required for sealing, said switch being operated when the jaws of the machine have completely sealed off the plastic tube and the tube is ready for the actual sealing operation. When switch 39 closes, power is supplied to unijunction transistor 50 and its associated circuitry in a manner similar to that described for the preheat cycle. Upon application of this voltage, capacitor 51 charges through resistors 52 and 53. When capacitor 51 reaches the firing voltage of unijunction transistor 50, unijunction transistor 50 will then fire, causing capacitor 51 to discharge through resistor 46, thus developing a short spike of voltage across resistor 46.

The spike of voltage across resistor 46 is coupled by means of lines 45 and 47 to gate terminal 48 of controlled rectifiers 33, 33A, again supplying a triggering signal thereto in the same manner as was provided in the preheat portion of the operation. The firing angle of the silicon controlled rectifiers 33, 33A as controlled by unijunction transistor 50 is, however, normally at an earlier point on the half cycle than was provided by the firing signal from unijunction transistor 40 which causes a much greater amount of power to be supplied to heater 35.

In order to shut off the heat at a predetermined time, power also is supplied to unijunction transistor 56 and its associated circuitry in portion 55 of the circuit. Capacitor 57 charges through resistors 58 and 59. When capacitor 57 charges to the firing voltage of unijunction transistor 56, transistor 56 will fire, causing capacitor 57 to discharge through resistor 60 causing a spike of voltage to appear across resistor 60, which spike of voltage is coupled through capacitor 61 to the gate 63 of controlled rectifier 64. Controlled rectifier 64 places a short circuit between points 65 and 66, to short circuit the D.C. voltage supplied previously to transistors 50 and 56 in circuits 36 and 55 to cause the heating operation to cease.

The voltage spike developed across resistor 60 is also coupled by means of capacitor 66 to the gate 57 of silicon controlled rectifier 68. Controlled rectifier 68 places a short circuit between points 69, 70 to short the D.C. power previously supplied to circuit 37, causing circuit 37 also to cease operation.

When circuit 37 ceases operation, the voltage pulses fed to controlled rectifiers 33, 33A from unijunction transistor 40 also cease. Thus, it is seen that with cessation of the triggering voltages to controlled rectifiers 33, 33A, these will no longer conduct and will remain in blocking condition so as to remove all power from heater means 35. Thus, the circuit has been rendered completely inoperative until such time as both switches 38 and 39 in the machine are reopened. In the event that one switch opens, the circuit will continue inoperative, it being necessary that both switch 38 and 39 be open in order to permit reactivation of the circuit thereafter.

The means by which the circuit is kept inoperative until both switches 38 and 39 are open will now be described. Controlled rectifiers 68 and 64, by virtue of the nature of controlled rectifiers, will remain in a conducting state as long as voltage is available to them. While these controlled rectifiers are in a conducting state, they will short circuit the D.C. power previously supplied to their respective circuits. In the event that switch 38, for example, should open, controlled rectifier 68 would cease conducting and normally would permit D.C. power to be applied to circuit 37 in the event switch 38 were to reclose at this point. However, with switch 39 still closed, controlled rectifier 64 is still conducting. Controlled rectifier 64 draws current through switch 39, diode 71, resistor 72 and resistor 73. Resistor 73 is of much lower resistance than resistor 72, so that the voltage dividing action between resistors 72 and 73 will cause the voltage at point 74B to be too low to operate circuit 37 in the event switch 38 should close at this time prior to the opening of switch 39.

The same safety factor exists in the event switch 39 should open and reclose prior to the opening of switch 38. In this case, controlled rectifier 68 would draw current through resistor 74A, diode 71 and resistor 72, to cause the voltage available at point 74B to be too low to operate circuit 55 in the event switch 39 should reclose at this time.

Thus it is seen that once the cycle of operation has been completed, the circuit will remain inoperative until such time as both switches 38 and 39 in the packaging machine are reopened. At this time, the circuit is ready to start another cycle of operation upon movement of the jaws 15, 16 toward the tube.

It is to be understood that various conventional features can be incorporated in the packaging machine, such as the supplying of cooling water (not shown) to the jaws of the machine upon completion of the high heating portion of the cycle.

Resistor 59 can be adjusted in order to vary the predetermined time in which high heat is effective. Two pole switch 76, 77 is provided to change amplitude and range of time during which power for the high heat portion of the cycle is applied. With switch 76, 77 in the position shown, a low time range of high heat time is available, the circuit being adjusted by means of variable resistor 59 to apply high heat for a period of approximately 1 to 10 cycles of a 60-cycle supply. With switch 76, 77 moved to the lower position (FIG. 2), a longer range of time will be effected and the maximum effective voltage applied to the heater reduced. The time then can be changed by means of the variable resistor 59 from approximately 8 cycles to 60 cycles of the 60-cycle supply. Pole 77 connects capacitor 78 in parallel with capacitor 57 to effect a longer time range. The other pole 76 varies the effective resistance in series with resistor 53 to change the maximum amount of high heat power available to the heater. This is desirable because if the high adjustment resistor 53 is set too high, and switch 76 is adjusted to the long time period, it would be possible to damage heater 35 by applying too much power. Thus, resistor 80 is provided in series with resistor 53 when switch 76 is moved to the longer time cycle or lower position. Such effectively reduces the maximum amount of power which can be delivered to heater 35 by changing the time constant of resistor 53 and capacitor 51. A synchronizing signal is supplied through wires 80, 81, 82 to the unijunction transistors 40 and 50.

It should be apparent that details of the circuit can be changed and that the arrangement can be used for different purposes without departing from the spirit of the invention except as defined in thte appended claims.

What is claimed is:

1. In a control circuit for providing in a machine a plurality of power heating levels from an A.C. power source, the combination including silicon controlled rectifier means connected between said source and electric heating load means, first switch means, first timer circuit means connected to the gating means of said silicon controlled rectifier means, said first timer means including first unijunction transistor means being energized by said first switch means operated by the machine being controlled, said first timer means gating said rectifier means for one predetermined time of a half cycle, second switch means, second timer circuit means including second unijunction transistor means connected to the gating means of said silicon controlled rectifier means gating said rectifier means for another predetermined time of a half cycle to provide another level of power to said heating load means, said second timer circuit means being activated by said second switch means actuated by the machine being controlled, and third timing circuit means including a third unijunction transistor and a shorting means connected with the circuit means for said first and second unijunction transistors for deactivating said silicon controlled rectifier means and both said first and second timer means.

2. A control circuit as set forth in claim 1 in which adjustable control means included in the circuit means for said first and second unijunction transistors provides for varying the predetermined parts of a half cycle during which the silicon controlled rectifier means is gated thereby to vary the power suppied at the respective power levels.

3. A control circuit as set forth in claim 1 in which means connected in the circuit means for said first and second unijunction transistors maintains said first and second timer means deactivated unless both said switches are first opened.

4. A control circuit as set forth in claim 1 in which said third timing circuit means includes adjustable resistance means for controlling operation of said third unijunction transistor thereby to vary the time during which power is supplied to said load at one of said power levels.

5. A control circuit as set forth in claim 4 in which selectively operable means connected with said third timing circuit means provides for varying the range of operation of said adjustable resistance means.

6. A control circuit as set forth in claim 1 in which adjustable control means included in the circuit means for one of said first mentioned unijunction transistors provides for varying the predetermined parts of a half cycle during which the silicon controlled rectifier means is gated thereby to vary the power supplied at a high power level, said third timing circuit means includes adjustable means for controlling operation of said third unijunction transistor to vary the time during which power is supplied to said load at high power level, and means including a circuit means connected with said third timing circuit means and a circuit means connected with the circuit means of said one unijunction transistor provides for selectively increasing the time range of the third timing circuit and simultaneously decreasing the maximum amount of power deliverable to said load at said high power level.

7. In a packaging machine having heating elements for sealing packages moving past said elements, the combination including silicon controlled rectifier means for supplying A.C. power to said heating elements in accordance with the portion of a half cycle the rectifier means is conducting, a first timer circuit for providing a preheat level to said elements, said first timer circuit being activated by a first switch means operated by said machine and providing gating pulses to said rectifier means to produce preheat temperature at said heating elements, a second timer circuit for providing a higher heat level, said second timer circuit being activated by a second switch means operated by said machine, and providing gating pulses to said rectifier means to produce a higher heat level at said heating elements, and timer means connected to said other timer circuits deactivating both of said timer circuits after a predetermined time.

8. In a packaging machine having heating elements for sealing packages moving past said elements, the combination including silicon controlled rectifier means for supplying A.C. power to said heating elements in accordance with the portion of a half cycle the rectifier means is conducting, a first timer circuit including unijunction transistor means for providing a preheat level to said elements, said first timer circuit being activated by a first switch means operated by said machine and providing gating pulses to said rectifier means to produce preheat temperature at said heating elements, a second timer circuit including unijunction transistor means for providing a higher heat level, said second timer circuit being activated by a second switch means operated by said machine, and providing gating pulses to said rectifier means to produce a higher heat level at said heating elements, and timer means deactivating both of said timer circuits after a predetermined time.

References Cited by the Examiner

UNITED STATES PATENTS

| | | | |
|---|---|---|---|
| 3,051,813 | 8/1962 | Busch et al. | 219—501 |
| 3,097,314 | 7/1963 | Harriman | 219—501 |
| 3,159,737 | 12/1964 | Dora | 219—501 |
| 3,221,142 | 11/1965 | Kamide | 219—501 |

RICHARD M. WOOD, *Primary Examiner.*

ANTHONY BARTIS, *Examiner.*

L. H. BENDER, *Assistant Examiner.*